United States Patent [19]

Monks

[11] 4,045,083
[45] Aug. 30, 1977

[54] LONGWALL MINING MACHINE WITH HAULAGE MOTOR SENSED PRESSURE CONTROLLED RAIL BRAKE

[75] Inventor: Harry Monks, Burton-on-Trent, England

[73] Assignee: Coal Industry (Patents) Limited, London, England

[21] Appl. No.: 657,876

[22] Filed: Feb. 13, 1976

[30] Foreign Application Priority Data

Feb. 28, 1975 United Kingdom ............... 08436/75

[51] Int. Cl.² ............................................. E21C 29/16
[52] U.S. Cl. .......................................... 299/1; 299/47; 188/67
[58] Field of Search ........................ 299/1, 12; 188/170, 188/67, 44, 43; 192/3 N

[56] References Cited

U.S. PATENT DOCUMENTS

| 2,171,204 | 8/1939 | Vickers | 192/3 N |
| 3,253,683 | 5/1966 | Stein | 192/3 N |
| 2,327,325 | 8/1943 | Zavatkay | 188/43 |
| 3,439,579 | 4/1969 | Guinot | 192/3 N X |
| 3,486,592 | 12/1969 | Kolk et al. | 188/44 X |
| 3,647,027 | 3/1972 | Jaseph | 188/170 X |

*Primary Examiner*—Ernest R. Purser
*Attorney, Agent, or Firm*—James C. Wray

[57] ABSTRACT

The control of a mineral mining machine having a hydraulic haulage motor senses the pressure of pressure fluid fed to the drive motor to apply brake mechanism when the sensed pressure is below a preselected value.

11 Claims, 1 Drawing Figure

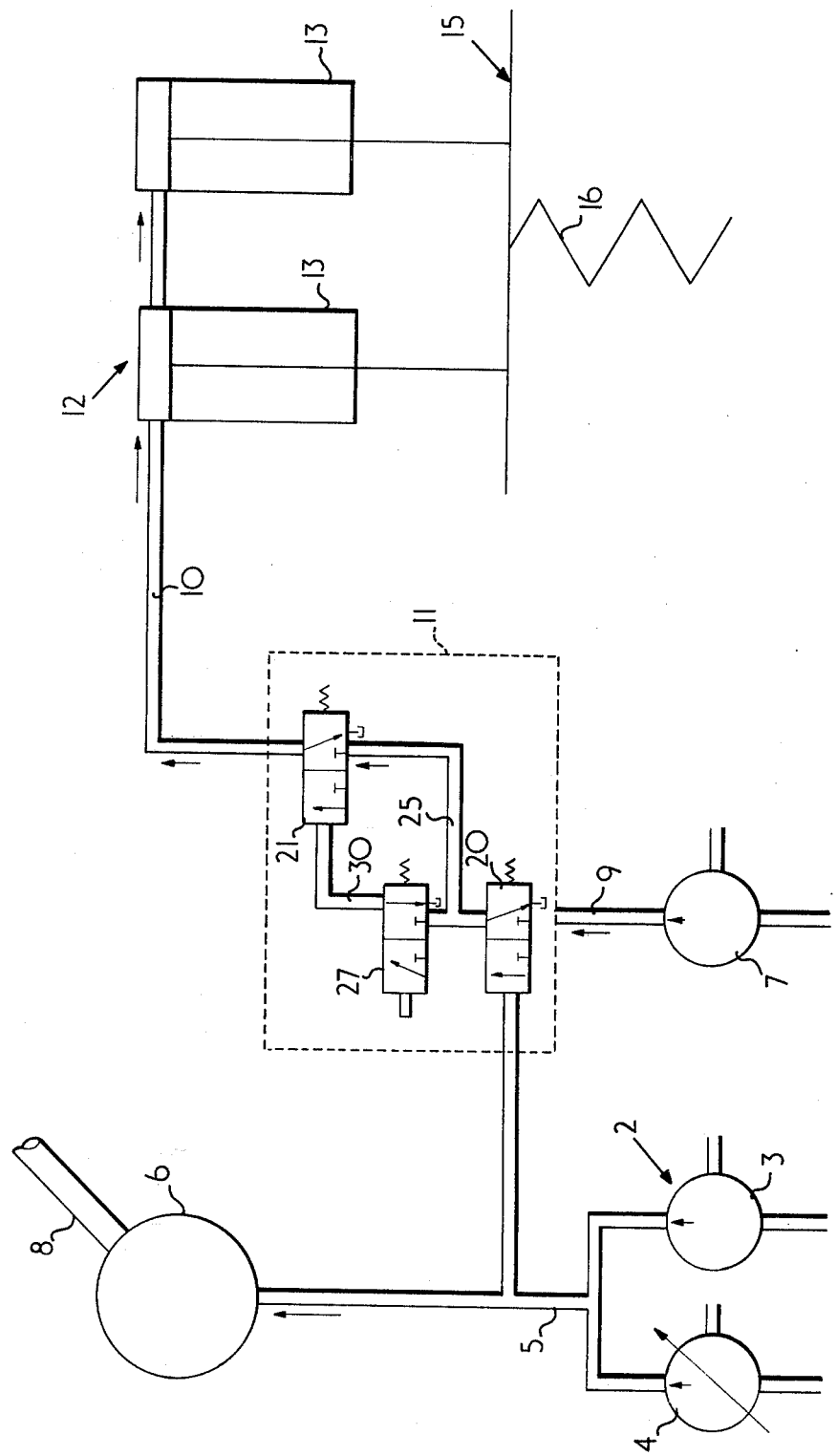

LONGWALL MINING MACHINE WITH HAULAGE MOTOR SENSED PRESSURE CONTROLLED RAIL BRAKE

This invention relates to mineral mining machines and in particular to mineral mining machines which in use traverse to and fro along an anchorable elongated member.

In particular, although not exclusively this invention relates to such mining machines which in use have rotary cutter heads mounted on ranging arms and rotatable about axes transverse to the direction of travel of the machine. With such a mining machine it is possible for the machine operator to place the machine haulage in neutral whilst he ranges the arm to change the cutting horizon of the cutter head within the mineral seam. Unfortunately, with the machine haulage control in neutral it is possible for the rotating cutter head to react with a hard boundary of the mineral seam to act as a drive mechanism for the machine which, thereby may be propelled along at a dangerously high speed.

An object of the present invention is to provide an improved mineral mining machine.

According to the present invention a mineral mining machine comprises a driven hydraulic pump for feeding pressure fluid to a hydraulic drive motor arrangeable to drive the machine's haulage mechanism, and means sensitive to the pressure of the pressure fluid feed to the hydraulic motor to control actuation of a brake on the machine such that in use when the sensed pressure is below a preselected value the brake is applied.

Preferably, the brake is biased towards the applied position and the machine comprises a further driven hydraulic pump for supplying pressure fluid to release the brake and in which case the said means may include a hydrualic control valve sensitive to the pressure fluid fed to the drive motor and arranged to block the feed of pressure fluid to the brake when the sensed pressure is below the preselected value.

By way of example only, one embodiment of the present invention will be described with reference to the accompanying drawing which is an incomplete hydraulic circuit diagram of a mineral machine constructed in accordance with the present invention.

The machine is arranged to traverse to and fro along a track assembly including a longwall face armoured conveyor and a rail anchored to the conveyor pans. The machine has a cutting arrangement (not shown) including a rotary cutter head mounted on a ranging arm projecting from the machine body, the axis of rotation of the cutter head being transverse to the machine's cutting direction.

Referring to the drawing, the machine has an electrically driven hydraulic pump arrangement 2 including a fixed delivery pump 3 and a variable delivery pump 4. The single pump 4 normally is used during cutting when the machine traverses along the face at relative low speeds while both pumps 3 and 4 are used when the machine flits along the face at relatively high speeds. The pump arrangement 2 feeds pressure fluid along feed pipe 5 to a hydraulic drive motor 6 arranged to drive the machine's haulage mechanism a portion of which is indicated by a shaft 8 and which for example may comprise a sprocket (not shown) drivably engageable with a fixed haulage chain arranged along the longwall face.

The machine comprises a further electrically driven pump 7 which is independent of the pump arrangement 2 and which feeds pressure fluid along feed pipes 9 and 10 via a hydraulic valve block 11 to a brake mechanism 12 diagrammatically indicated as a plurality of piston and cylinder arrangements 13 acting on a brake pad 15 against the action of a spring 16 urging the brake pad 15 to its applied position engaging the previously mentioned rail extending along the longwall face. The pressure fluid supply to the brake mechanism can be interrupted by valves 20 and 21 included in the valve block 11 to allow the brake mechanism to be applied under the action of its spring loading.

The spring loaded valve 20 is sensitive to the feed of pressure fluid in the feed pipe 5 to open the valve against the action of its spring loading and allow pressure fluid along a branched line 25 to a spring loaded solenoid valve 27 and the previously mentioned spring loaded valve 21.

The valve 27 controls the actuation of the valve 21 and is itself controlled by an electric signal feed from an electrical control panel position adjacent the end of the longwall face and sensitive to the tension in the previously mentioned fixed haulage chain. The control panel ensures that the brake mechanism 12 is applied if the haulage chain should break. Such a safety arrangement would only be provided on machines required to operate on steeply inclined faces.

When the valve 27 is actuated by the control panel it moves against its spring loading to feed pressure fluid along pilot line 30 to actuate valve 21 against its spring loading to feed pressure fluid to the brake mechanism to release the brake. If in operation the haulage chain should break, the signal from the control panel is cut off allowing the valve 27 to move under its spring loading to remove the pilot pressure on valve 21 which thereby moves under its spring loading to exhaust pressure fluid from the brake mechanism 12 to rapidly apply the brake.

Thus, in use when the machine operator starts the pump arrangement 2, the machine's haulage control would normally be in neutral so that pressure fluid from the pump arrangement is fed back to tank and the valve 20 remains in the closed position under the action of its spring loading and the brake mechanism remains applied under the action of its spring loading. Upon the operator moving the haulage control to drive the haulage drive motor, the build up of pressure in feed pipe 5 is sensed by the valve 20 which moves against its spring loading to permit pressure fluid to flow into branched line 25. Upon the haulage chain becoming tensioned the control panel actuates the valve 27 which in turn (as previously described) actuates the valve 21 to feed pressure fluid to the brake mechanism to release the brake against its spring loading.

If, in operation the operator moves the machine's haulage control into neutral the pressure fluid in feed pipe 5 is exhausted causing the valve 20 to close under its spring loading exhausting pressure fluid from the brake mechanism which, thereby is applied rapidly. Thus, when the sensed pressure is below a preselected value the brake is automatically applied. Consequently when the haulage control is in neutral and no pressure fluid is fed to the device motor the brake is applied to prevent uncontrolled movement of the machine.

From the above description it will be seen that the present invention provides a mining machine in which the brake is applied every time the machine is parked, i.e. the machine's haulage control is placed in its neutral position.

In other embodiments of the invention for use on faces which are not steeply inclined the valves 21 and 27 may be dispensed with.

In further embodiments the means for sensing pressure fluid in feed pipe 5 may be other than a hydraulic valve, for example, an electrical device.

In still other embodiments of mining machine the haulage mechanism may comprise a drive component or arrangement arranged to engage abutments arranged along the longwall face.

I claim:

1. A mineral mining machine comprising haulage mechanism including a hydraulic motor for hauling the machine to and fro along a rail extending along a longwall face, first hydraulic pump means for feeding pressure fluid to drive the hydraulic motor, a first hydraulic control for controlling the feed of pressure fluid to said hydraulic motor, a resiliently biased rail-engaging brake operable under its resilient bias towards its applied position to prevent movement of the machine along said path, second hudraulic pump means separate from the said first hydraulic pump means for supplying pressure fluid tending to move the brake against its resilient bias towards its released position to allow movement of the machine along said path, a second hydraulic control for controlling the supply of pressure fluid from said second hydraulic pump means to said brake, and means responsive to the operational condition of the machine's haulage mechanism to thereby actuate said second hydraulic control to block off the pressure fluid supply to cause application of said brake against said rail to prevent uncontrolled movement of the machine along said path.

2. A machine as claimed in claim 1, in which the second hydraulic control comprises valve controlled by a sensor sensitive to the tension in a haulage chain drivably engaged by the machine's haulage mechanism.

3. A machine as claimed in claim 1, in which said means responsive to the operational condition of the machine's haulage mechanism comprises a sensor sensitive to the pressure of the pressure fluid feed to the hydrualic motor.

4. A machine as claimed in claim 3, in which the sensor controls actuation of the brake such that in use when the sensed pressure is below a preselected value the brake is applied.

5. The mineral mining machine as claimed in claim 1. in which the second hydraulic control comprises a hydraulic pressure line connected between the second hydraulic pump means and the brake, a valve connected in the hydraulic pressure line for selectively sommunicating the second hydraulic pump means with the rail-engaging brake and to exhaust fluid from the brake and wherein the responsive means comprises means for moving the valve from its normal exhaust position to a position communicating pressure from the second pump means to the brake.

6. The mineral mining machine as claimed in claim 5, wherein the responsive means comprises a pilot line connected between the second pump means and the valve for moving the valve into its communicating position upon application of pressure through the pilot line to the valve and a pilot valve movable between positions communicating the second pump with the valve and exhausting the valve and means for moving the pilot valve according to operational condition of the machine's haulage mechanism.

7. The mineral mining machine as claimed in claim 1 wherein the brake is mounted on the machine adjacent the rail independently of the motor and haulage mechanism and wherein the resilient bias biases the brake against the rail and wherein the second pump means supplies pressure to the brake to move the brake against the resilient bias away from the rail.

8. A machine as claimed in claim 6 in which the brake is biased towards the applied position.

9. A mineral mining machine comprising haulage mechanism, for moving the machine to and fro along a rail a first driven hydraulic pump for feeding pressure fluid to a hydraulic drive motor arrangeable to drive the machine's haulage mechanism, a hyraulic rail-engaging brake, a second hydraulic pump separate from the first hydraulic pump for supplying hydraulic fluid to the brake, and means sensitive to the pressure of the pressure fluid feed to the hydraulic motor to control supply of hydraulic fluid to the brake such that in use when the sensed motor feed pressure is below a preselected value the brake is applied against said rail.

10. The mineral mining machine of claim 9 wherein the brake comprises a brake pad mounted on the machine adjacent the rail independently of the drive motor and haulage mechanism, and wherein the brake is applied by forcing the brake pad into braking engagement with the rail.

11. A machine as claimed in claim 9, in which said means include a hydraulic control valve sensitive to the pressure fluid fed to the drive motor and arranged to block the feed of pressure fluid to the brake when the sensed pressure is below the preselected value.

* * * * *